(12) United States Patent
Juenemann et al.

(10) Patent No.: US 8,527,785 B2
(45) Date of Patent: *Sep. 3, 2013

(54) TRANSITIONING A COMPUTING PLATFORM TO A LOW POWER SYSTEM STATE

(75) Inventors: Dale Juenemann, Forest Grove, OR (US); Paul Diefenbaugh, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 252 days.

This patent is subject to a terminal disclaimer.

(21) Appl. No.: 12/962,478

(22) Filed: Dec. 7, 2010

(65) Prior Publication Data

US 2011/0078475 A1    Mar. 31, 2011

Related U.S. Application Data

(63) Continuation of application No. 11/541,222, filed on Sep. 29, 2006, now Pat. No. 7,849,334.

(51) Int. Cl.
*G06F 1/00* (2006.01)
*G06F 1/32* (2006.01)

(52) U.S. Cl.
USPC ........... 713/300; 713/320; 713/322; 713/323; 455/574

(58) Field of Classification Search
USPC .................. 713/300, 320, 322, 323; 455/574
See application file for complete search history.

(56) References Cited

U.S. PATENT DOCUMENTS

| | | | |
|---|---|---|---|
| 4,922,448 A | 5/1990 | Kunieda et al. | |
| 5,692,202 A | 11/1997 | Kardach et al. | |
| 5,721,937 A | 2/1998 | Kurihara et al. | |
| 5,884,088 A | 3/1999 | Kardach et al. | |
| 5,983,357 A | 11/1999 | Sun | |
| 5,991,889 A | 11/1999 | Hikichi et al. | |
| 6,058,485 A | 5/2000 | Koziuk et al. | |
| 6,105,142 A | 8/2000 | Goff et al. | |
| 6,357,013 B1 | 3/2002 | Kelly et al. | |
| 6,460,143 B1 | 10/2002 | Howard et al. | |
| 6,708,278 B2 | 3/2004 | Howard et al. | |

(Continued)

OTHER PUBLICATIONS

Third Office Action for Chinese Patent Application No. 200780035771.2, Mailed Jul. 27, 2011, 8 pages.

(Continued)

*Primary Examiner* — Kim Huynh
*Assistant Examiner* — Michael J Brown
(74) *Attorney, Agent, or Firm* — Blakely, Sokoloff, Taylor & Zafman LLP (57) ABSTRACT

A method which includes initiating a power management policy based on a processing element for a computing platform entering a given power state. The power management policy includes a determination as to whether an input/output (I/O) controller and a memory controller for the computing platform are substantially quiescent. The computing platform may then be transitioned to a low power system state from a run power system state based on a determination that both the I/O controller and the memory controller are substantially quiescent and an indication that the computing platform is capable of entering the low power system state. According to this method, the low power system state includes entering one or more devices responsive to the computing platform in a power level adequate to retain a configuration state that enables the one or more devices to transition back to the run power system state in a manner that is substantially transparent to an operating system for the computing platform. Other implementations and examples are also described in this disclosure.

26 Claims, 4 Drawing Sheets

(56) References Cited

U.S. PATENT DOCUMENTS

| | | |
|---|---|---|
| 6,727,952 B1 | 4/2004 | Hirata et al. |
| 6,820,169 B2 | 11/2004 | Wilcox et al. |
| 7,003,639 B2 | 2/2006 | Tsern et al. |
| 7,334,142 B2 | 2/2008 | Hack |
| 7,454,639 B2 | 11/2008 | Jain et al. |
| 7,631,199 B2 | 12/2009 | Kardach et al. |
| 7,849,334 B2 | 12/2010 | Juenemann et al. |
| 2005/0149640 A1 | 7/2005 | Hosokawa |
| 2006/0090091 A1 | 4/2006 | Li |
| 2006/0117193 A1 | 6/2006 | Gosselin et al. |
| 2007/0005997 A1 | 1/2007 | Kardach et al. |
| 2010/0083013 A1 | 4/2010 | Kardach et al. |

OTHER PUBLICATIONS

Office Action from CN200780035771.2 mailed Dec. 23, 2011, 12 pgs.
Non-Final Office Action for U.S. Appl. No. 11/541,222 mailed Jun. 24, 2009.
Non-Final Office Action for U.S. Appl. No. 11/541,222 mailed Feb. 5, 2010.
Non-final Office Action for Chinese Patent Application No. 200780035771.2 mailed Jun. 10, 2010.
Non-final Office Action for U.S. Appl. No. 11/173,784 mailed Aug. 27, 2008.
Non-final Office Action for U.S. Appl. No. 11/173,784 mailed Jan. 6, 2009.
Notice of Allowance for U.S. Appl. No. 11/173,784 mailed Jul. 23, 2009.
Notice of Allowance for U.S. Appl. No. 11/541,222 mailed Jun. 15, 2010.
Non-final Office Action for U.S. Appl. No. 11/173,784 mailed Oct. 4, 2007.
Non-final Office Action for U.S. Appl. No. 11/173,784 mailed Apr. 10, 2008.
Non-final Office Action for Chinese Patent Application No. 200780035771.2 mailed Jan. 25, 2011.
Non-Final Office Action for Taiwan Patent Application No. 096136558 mailed Mar. 9, 2011.
Notice of Allowance for U.S. Appl. No. 11/541,222 mailed Sep. 24, 2010.
42P24469PCT IPRP mailed Apr. 9, 2009 for PCT/US2007/020749.
42P24469PCT ISR and WO mailed Jan. 11, 2008 for PCT/US2007/020749.
Hewlett-Packard Corporation, et al., "Advanced Configuration and Power Interface Specification", Revision 3.0a, Dec. 30, 2005.
Office Action from DE Patent App. No. 112007001987.5 mailed Jan. 30, 2012, 10 pages.
Office Action dated Jul. 20, 2012 (+ English translation), in German Patent Application No. 11 2007 001 987.5, 4 pages.
Office Action issued May 14, 2012 (+ English translation), in Chinese Patent Application No. 200780035771.2, 7 pages.
Office Action mailed Jun. 22, 2012, in U.S. Appl. No. 12/632,548, 18 pages.

TRANSITIONING A COMPUTING PLATFORM TO A LOW POWER SYSTEM STATE

RELATED APPLICATIONS

This application is a continuation of U.S. application Ser. No. 11/541,222, filed Sep. 29, 2006, to be issued as U.S. Pat. No. 7,849,334, the contents of which are incorporated herein by reference in their entirely; and is related to commonly assigned U.S. application Ser. No. 11/173,784, filed Jun. 30, 2005, now U.S. Pat. No. 7,631,199.

BACKGROUND

Typically, for a computing platform (e.g., a personal computer), power management is coordinated and controlled by an operating system and its associated software (e.g., power management software). Various industry standards describe how power management may by implemented by the computing platform and the operating system. One such industry standard is the Advanced Configuration Power Interface Specification, Revision 3.0a, published Dec. 30, 2005, and/or later revisions ("the ACPI Specification"). The ACPI specification defines computing platform or system power states as "S-states" and these states are denoted in the ACPI specification as S0, S1, S2, S3, S4 and S5. In a common usage these S-states are available for power management of a computing platform. The S-states include three categories that are denoted in the ACPI specification as "working", "sleeping" and "soft off" states. The working state includes the S0 state, the sleeping state includes S1, S2, S3 and S4 states and the soft off state includes the S5 state. Transition of a computing platform between working, sleeping and soft off states is typically controlled by an operating system's power management software.

DETAILED DESCRIPTION

As mentioned in the background, transition of a computing platform between working, sleeping and soft off states is typically controlled by an operating system's power management software. The ACPI specification, for example, describes component power states for various components resident on or responsive to a computing platform. These component power states include "C-states" for processing elements (e.g., a central processing unit (CPU)) and "D-states" for other components resident on or responsive to a computing platform. These other components are hereinafter referred to as "devices" and may include, but are not limited to, controllers, memory, peripherals, etc.

In one example, when one or more of the computing platform's processing elements are idle or operating below full capacity, the operating system's power management software places those idle processing elements in lower C-states. As described more below, and according to the ACPI specification, the higher the C-state the less power consumed by the processing element. For example, a processing element in a C3 power state consumes less power than when the processing element is in a C0, C1, or C2 power state.

Typically, while the one or more processing elements are placed into a low power C-state, the operating system's power management software leaves most devices in a power state that consumes a significant amount of power. This is because, for example, inherent latency penalties caused when devices are transitioned by the operating system's power management software between high and lower power consuming D-states can be greater than the period of time the processing element is actually is in a lower power state, or device functionality required by OS (or end user) is lost when entering a lower power consuming D-state. Thus, involvement of the operating system's power management software in transitioning devices between higher and lower power consuming D-states is problematic to power saving efforts for a computing platform that includes one or more processing elements which are quickly (e.g., fractions of a second) transitioning between higher and lower power consuming C-states.

In one example, a method is implemented that includes initiating a power management policy based on a processing element for a computing platform entering a given power state. The power management policy is to include a determination as to whether an input/output (I/O) controller and a memory controller for the computing platform are substantially quiescent, e.g., a period of relatively no activity, network traffic, memory requests, etc. The computing platform may then be transitioned to a low power system state from a run power system state based on a determination that both the I/O controller and the memory controller are substantially quiescent and an indication that the computing platform is capable of entering the low power system state. According to this example method, the low power system state includes entering one or more devices responsive to the computing platform in a power level adequate to retain a configuration state that enables the one or more devices to transition back to the run power system state in a manner that is substantially transparent to an operating system for the computing platform.

Figure 1:
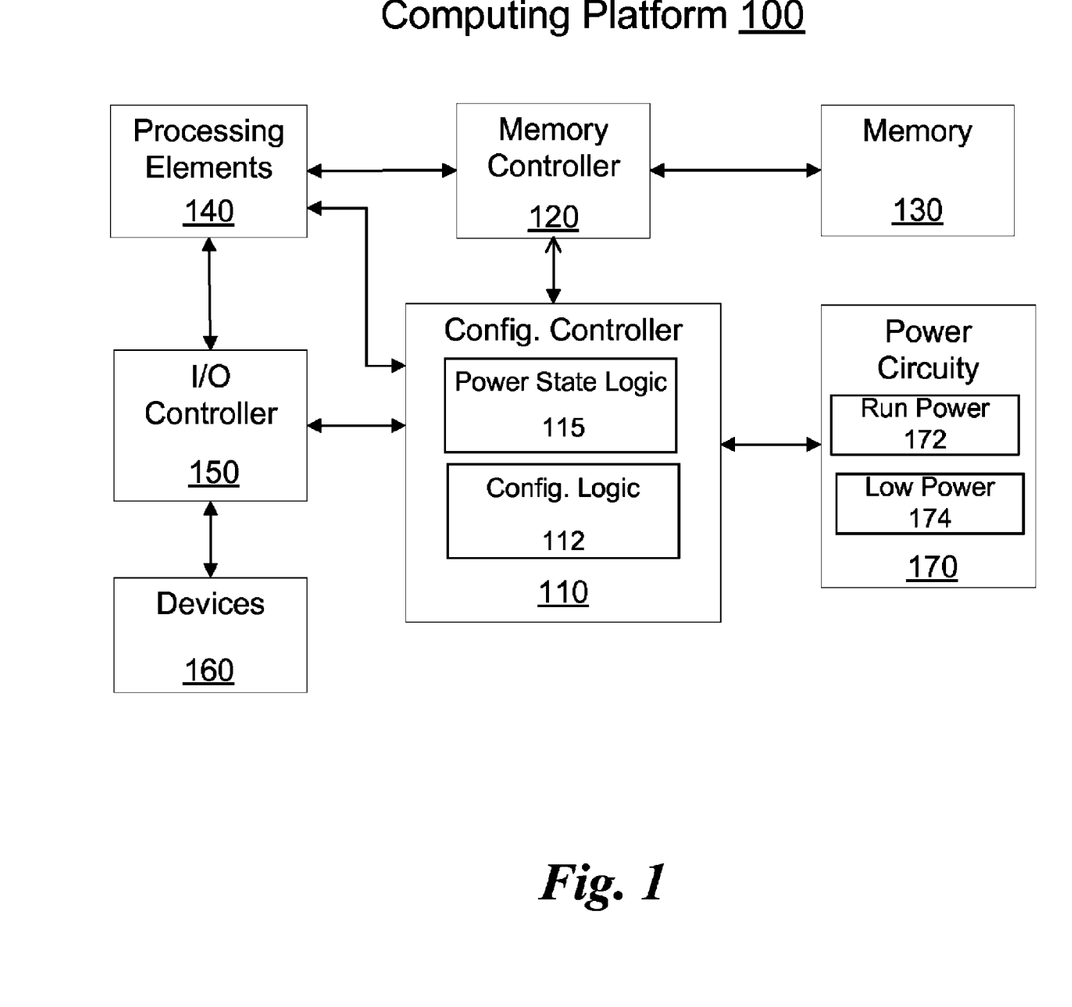
FIG. 1 is a block diagram of an example computing platform.

FIG. 1 is a block diagram of an example computing platform 100. Computing platform 100, for example, includes, but is not limited to, a computing platform for a two-way radio communication system, a one-way pager, a two-way pager, a personal communication system, a personal computer (e.g., laptop, desktop, notebook, ultra-mobile, etc.), a work station, a server, a personal digital assistant (PDAs), a digital broadband telephony device, a portable music, video or game player. In one implementation, as depicted in FIG. 1, computing platform 100 includes configuration controller 110, memory controller 120, memory 130, processing elements 140, input/output (I/O) controller 150, devices 160 and power circuitry 170. This disclosure is not limited to a computing platform that includes only these elements.

In one example, configuration controller 110 includes logic that is depicted in FIG. 1 as configuration logic 112 and power state logic 115. Configuration logic 112, for example, facilitates the configuration of one or more devices responsive to computing platform 100 for operation on computing platform 100. Power state logic 115, for example, facilitates the transition of computing platform 100 between a run power system state and a low power system state.

In one implementation, the run and low power system states are within the S0 power state as described by the ACPI specification. In this implementation, unlike a transition to and from an ACPI S3 power state, no or little involvement of the operating system's power management software is involved in the transitions of computing platform 100 between run (e.g., S0_run) and low (e.g., S0_standby) power system states. Thus, transitions between run and low power system states may be substantially transparent to the operating system's power management software. The transitions may also be transparent to an end-use, e.g. display screen is unchanged, network connections remain activated, etc. This transparency, for example, provides a look and feel to the OS and/or the end user that computing platform 100 is fully on when it is actually in a low power system state.

In one example, as depicted in FIG. 1, configuration controller 110 is maintained as a separate component resident on computing platform 100. But this disclosure is not limited to only this example of a separate configuration controller 110. Configuration controller 110, for example, may be integrated with other controllers or processing elements resident on computing platform 100 (e.g., in a firmware hub, manageability engine, chipset, system on a chip, etc.).

In one implementation, memory controller 120 facilitates or controls memory transactions (e.g., read or write requests) to memory 130. Memory 130, for example, includes system memory that is used or accessible to devices and/or components resident on or responsive to computing platform 100, e.g., processing elements 140, devices 160, etc. This system memory, for example, includes one or more dynamic random access memory (DRAM) modules (not shown).

Although not depicted in FIG. 1, in one example, memory controller 120 may be integrated with other components on computing platform 100. For example, memory controller 120 may be integrated with processing elements 140. Memory controller 120 may also reside with other controllers (e.g., I/O controller 150 and/or configuration controller 110) in a cluster of other components (e.g., in a chipset) resident on computing platform 100.

In one implementation, processing elements 140 represent any of a wide variety of logic device(s) or executable content to perform processing functions for computing platform 100, e.g., a central processing unit (CPU). Processing elements 140, for example, may include one or more of a microprocessor, a network processor, a service processor, a microcontroller, one or more sequestered cores of a multi-core microprocessor or combination thereof.

In one example, I/O controller 150 facilitates the control and management of devices 160 that are resident on or responsive to computing platform 100. Devices 160, for example, include but are not limited to one or more devices such as a keyboard, mouse, internal/external storage drive, display, wired/wireless network hardware (NICs), etc. These devices may couple to I/O controller 150 through various types of buses or interconnects. These buses or interconnects, for example, may operate according to various industry standard interconnect communication protocols to include Universal Serial Bus (USB), Peripheral Component Interconnect (PCI), PCI Express (PCI-e), Smart Management Bus (SMBus), HyperTransport, Low Pin Count (LPC), Serial Advanced Technology Attachment (SATA) and Parallel Advanced Technology Attachment (PATA), High Definition Multimedia Interface (HDMI), etc. This disclosure is not limited to only the above listed communication protocols for buses or interconnects to couple devices 160 to I/O controller 150.

In one implementation, power circuitry 170, as shown in FIG. 1, includes run power 172 and low power 174. Although not depicted in FIG. 1, run power 172 and low power 174, for example, may each include voltage regulators, power switches, power feeds and clock generators as needed to maintain the higher and lower power states. Run power 172, for example, provides power to enable all components to operate at or near full operational capacity. Low power 174, for example, provides power adequate for devices on or responsive to computing platform 100 to retain their configuration states and yet enables those devices to transition back to the run power system state in a manner that is substantially transparent to the operating system's power management software. This disclosure is not limited to only run and lower power system states. Other levels of power may be provided to computing platform 100 by power circuitry 170 as computing platform 100 is transitioned between high and lower power system states.

Figure 2:
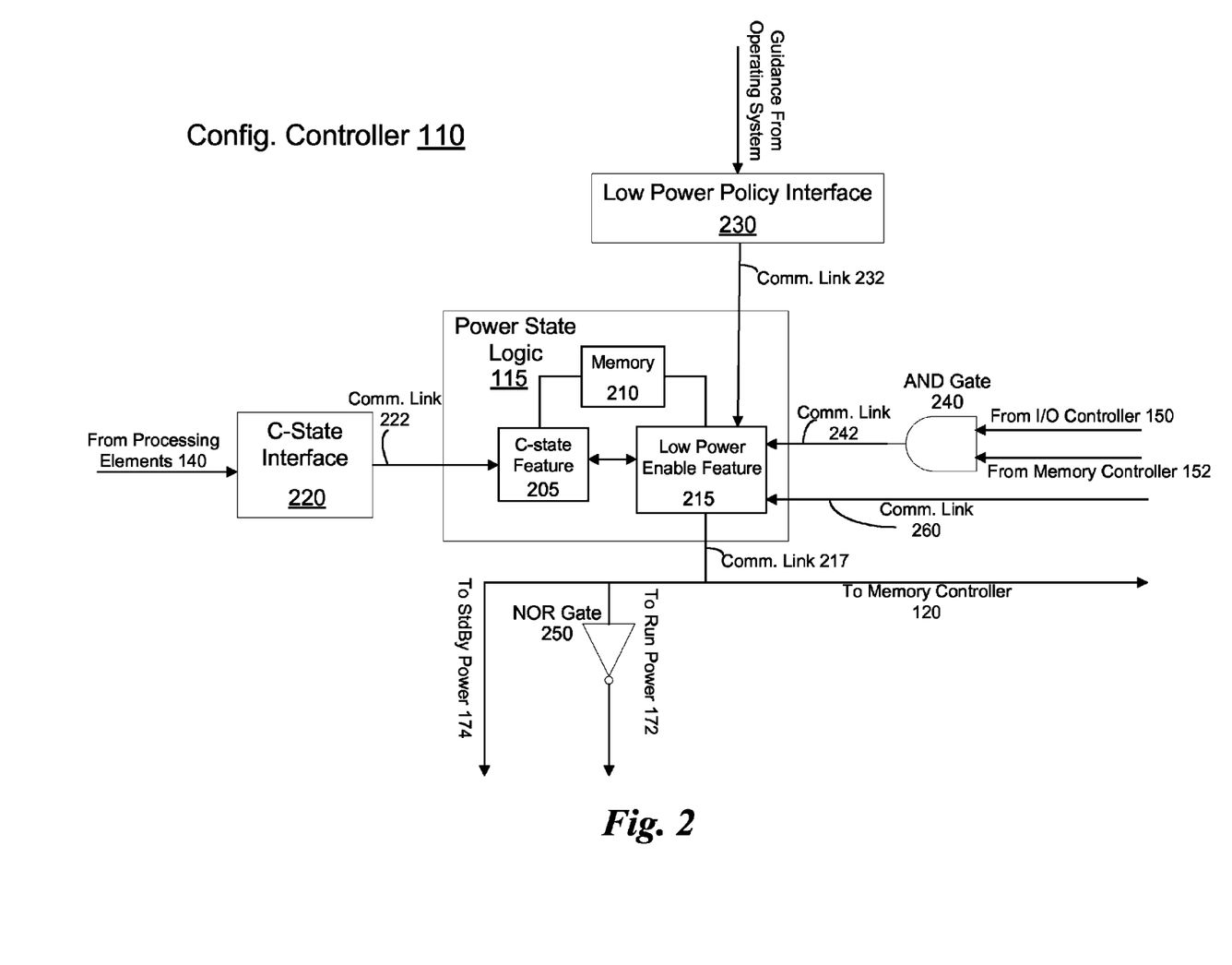
FIG. 2 is an example block diagram of a portion of a controller to include logic to transition the computing platform between higher and lower power states.

FIG. 2 is an example block diagram of a portion of configuration controller 110 to include power state logic 115 to transition all or portions of computing platform 100 between high and lower power system states. As shown in FIG. 2, for example, configuration controller 110 also includes various interfaces and logic gates coupled to power state logic 115 to facilitate this transition of computing platform 100. These interfaces and logic gates are portrayed as C-state interface 220, low power policy interface 230, AND gate 240 and NOR gate 250.

In one example, power state logic 115 and configuration logic 112 (see FIG. 1) each or collectively represent any of a wide variety of logic device(s) or executable content to cause computing platform 100 to transition between a run and a low power system state. These logic device(s) may include a microprocessor, network processor, service processor, microcontroller, field programmable gate array (FPGA), application specific integrated circuit (ASIC), sequestered thread or core of a multi-core/multi-threaded microprocessor, special operating mode of a processor or a combination thereof.

As portrayed in FIG. 2, for example, power state logic 115 includes c-state feature 205, memory 210 and low power enable feature 215. As described more below, c-state feature 205, memory 210 and low power enable feature 215 are activated or used by power state logic 115 to initiate a power management policy. The power management policy, for example, to cause computing platform 100 to transition between run and low power system states based on a C-state maintained by one or more processing elements of processing elements 140, substantially quiescent activity indications from I/O and memory controllers 150 and 120 and/or based on a wake signal via communication link 260.

In one implementation, computing platform 100 implements C-state power management states for processing elements 140 as described in the ACPI specification. Thus, in this implementation, a processing element of processing elements 140 and/or operating system power management software for computing platform 100 may send an indication to configuration controller 110 as to what C-state that processing element is currently maintaining.

In one example, C-state interface 220 may include a memory register of a given number of bits. These bits in C-state interface 220 may be selectively asserted to indicate the C-state maintained by one or more processing elements of processing elements 140. For example, if a given processing element transitions to a C1 power state, then the bits of the memory register are selectively asserted to indicate the given processing element is in the C1 power state. Power state logic 115, for example, may receive or access this indication via communication link 222.

In another example, C-state interface 220 includes a one or more shift registers (not shown) coupled to communication link 222. Portions of a given shift register (e.g., a flip-flop), for example, are associated with a given C-state for a given processing element of processing elements 140. The outputs of the associated portions of the shift register, for example, will indicate to power state logic 115 via communication link 222 what given C-state is currently being maintained by the given processing element.

In one implementation, configuration controller 110 also includes low power policy interface 230. Low power policy interface 230, for example, includes information to indicate a given C-state that computing platform 100 is enabled for transitioning from a run power system state to a low power system state. Low power policy interface 230 may also include information associated with requirements for one or more policies that are to be met before computing platform 100 is transitioned to a low power system state.

In one example, low power policy interface 230 includes an 8-bit memory register that is maintained by configuration controller 110 and/or configuration logic 115. In this example, one or more bits of the memory register may be selectively asserted to indicate the given C-state that computing platform 100 is enabled for transitioning from a run power system state to a low power system state (if enabled at all) and may also indicate requirements for that transition. Power state logic 215, for example, accesses or receives information from low power policy interface 230 to determine the given C-state and possible requirements for transitioning computing platform 100 between run and low power system states.

In one implementation, at least a portion of a power management policy includes requirements associated with guidance provided from an OS and/or its power management software via low power policy interface 230. In this implementation, the OS may selectively assert one or more bits of a memory register included in low power policy interface 230 to provide that guidance. The guidance, for example, may indicate to power state logic 115 such information as an expected duration for a given C-state and the threshold time values associated with maximum allowed latencies for transparently transitioning a computing platform between run and low power system states when a given processing element is in the given C-state. Thus, based on requirements associated with that guidance, for example, power state logic 115 causes computing platform 100 to transition between run and low power system states in a substantially transparent manner to the operating system.

In one implementation, c-state interface 220 serves as more of a hardware-based interface that includes memory registers or shift registers for power state logic 115 to gather information to determine whether to transition computing platform 100 to a low power system state. In this implementation, low power policy interface 230 serves as more of a software-based interface that may or may not rely on hardware-based components such as memory registers. Low power policy interface 230, for example, serves as a more flexible interface that allows for greater interaction between power logic 115 and elements resident on or remote to computing platform 100. These elements may include an OS for computing platform 100.

In one example, as shown in FIG. 2, configuration controller 110 includes AND gate 240. AND gate 240, for example, receives inputs from memory controller 120 and I/O controller 150. In one implementation, these inputs are indications of substantial inactivity or quiescence at memory controller 120 and I/O controller 150. Substantially quiescent activity at I/O controller 150, for example, is based on very little or no activity or traffic over one or more buses and/or interconnects coupled between I/O controller 150 and devices 160. Substantially quiescent activity at memory controller 120, for example, includes the draining of practically all outstanding memory transaction requests to memory 130. This disclosure is not limited to only these indications of substantially quiescent activity and is not limited to only an AND logic gate to receive these inputs.

In one implementation, the output of AND gate 240 indicates to power state logic 215 via communication link 242 that both memory controller 120 and I/O controller 150 are substantially quiescent. As described more below, power state logic 215 may use this indication to determine whether to cause computing platform 100 to transition between a run and a low power system state.

In one example, as portrayed in FIG. 2, configuration controller 110 also includes NOR gate 250. NOR gate 250, for example, receives an input signal via communication link 217 and produces an output that is sent to run power 172 of power circuitry 170. In one implementation, if no signal is received from low power enable feature 215, then a signal is sent to run power 172. This signal, for example, indicates to run power 172 that it is to provide computing platform 100 with adequate power to maintain a run power system state (e.g., S0 run power system state). In this implementation, when low power enable feature 215 sends a signal via communication link 217, the output signal from NOR gate 250 is cut off or gated. Thus indicating to run power 172 to disable run power to computing platform 100. A signal, for example, is then sent to low power 174 to provide computing platform 100 with low power. A signal is also sent, for example, to memory controller 120 to indicate to memory controller 120 to place at least portions of memory 130 (e.g., DRAM modules) in a low power self-refresh state. This disclosure is not limited to only a NOR logic gate to receive an input signal via communication link 217.

In one example, communication link 260 may be used to provide a wake signal. The wake signal, as described more below, provides an indication for power state logic 115 to cause computing platform 100 to transition out of the low power system state and back to the run power system state.

Figure 3:
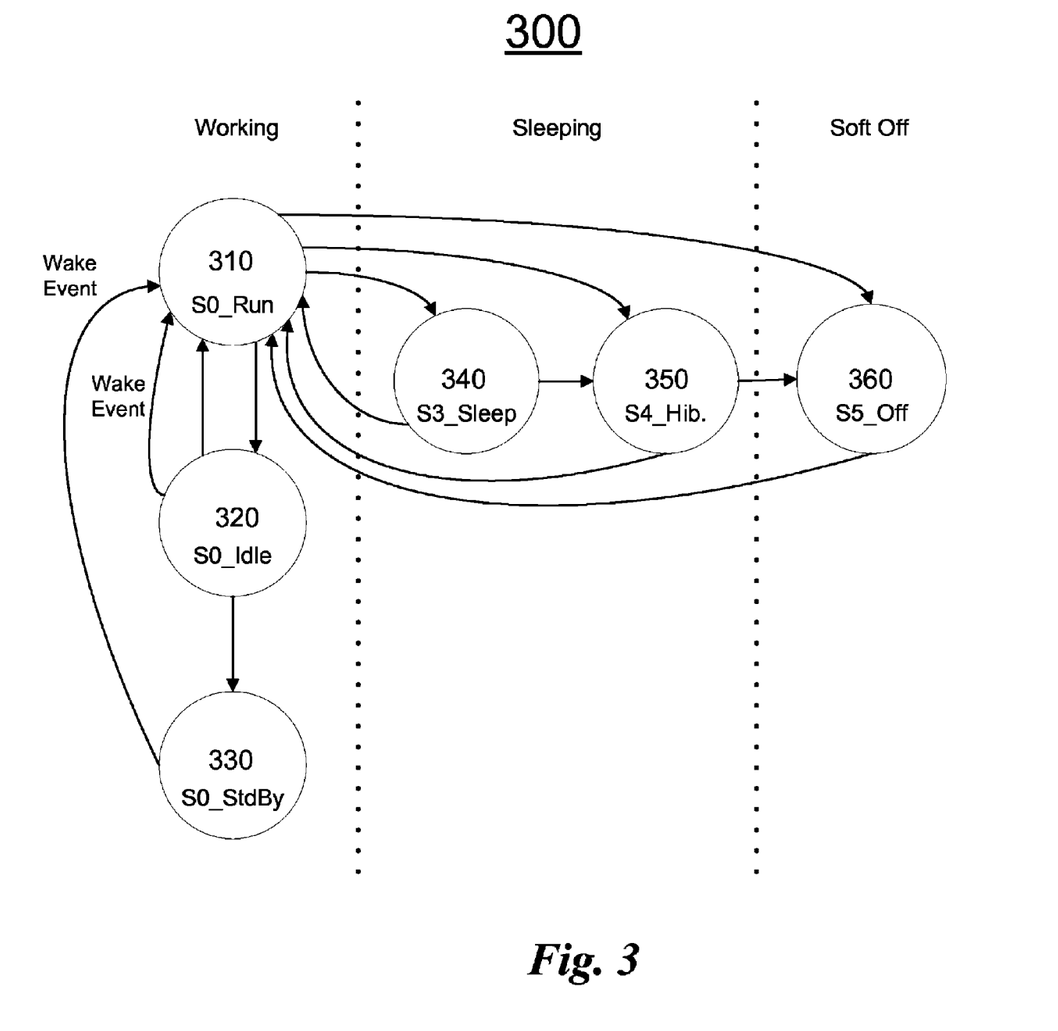
FIG. 3 is an example flow diagram of the computing platform transitioning to and from various power states.

FIG. 3 is an example flow diagram 300 of computing platform 100 transitioning to and from various power states. In one example, flow diagram 300 depicts computing platform transitioning between working (S0), sleeping (S3 and S4) and soft off (S5) power states. At least a portion of these working, sleeping and soft off states may be the same S-states described in the ACPI specification and are characterized, for example, as involving computing platform 100's operating system's power management software. Also depicted in flow diagram 300 are three different power system states within the S0 working power state (Run, Idle and Standby). Computing platform 100, for example may transition between these power states without the involvement of or substantially transparent to the operating system's power management software and also possibly transparent to an end user.

At state 310, for example, computing platform 100 is in a run power system system state. In this state, for example, processing elements 140 are in a fully operational or a C0 power state as described by the ACPI specification. From state 310, for example, computing platform 100 may transition to various other power states as depicted in flow diagram 300. Those involving the operating system's power management software to transition in and out of the various power states, as mentioned above, are the S3 sleep (S3_sleep) state at state 340, the S4 hibernate (S4_Hib) state at state 350 and the S5 off (S5_off) state at state 360. Those states not involving to the operating system's power management software or substantially transparent to the software are the S0 idle (S0_idle) state at state 320 and the S0 standby (S0_standby) state at state 330. In one example, as shown in FIG. 3, computing platform 100 may transition to state 310 from state 320 or 330 based on a wake event. These wake events and states 310, 320 and 330 are described in more detail below for FIG. 4.

Figure 4:
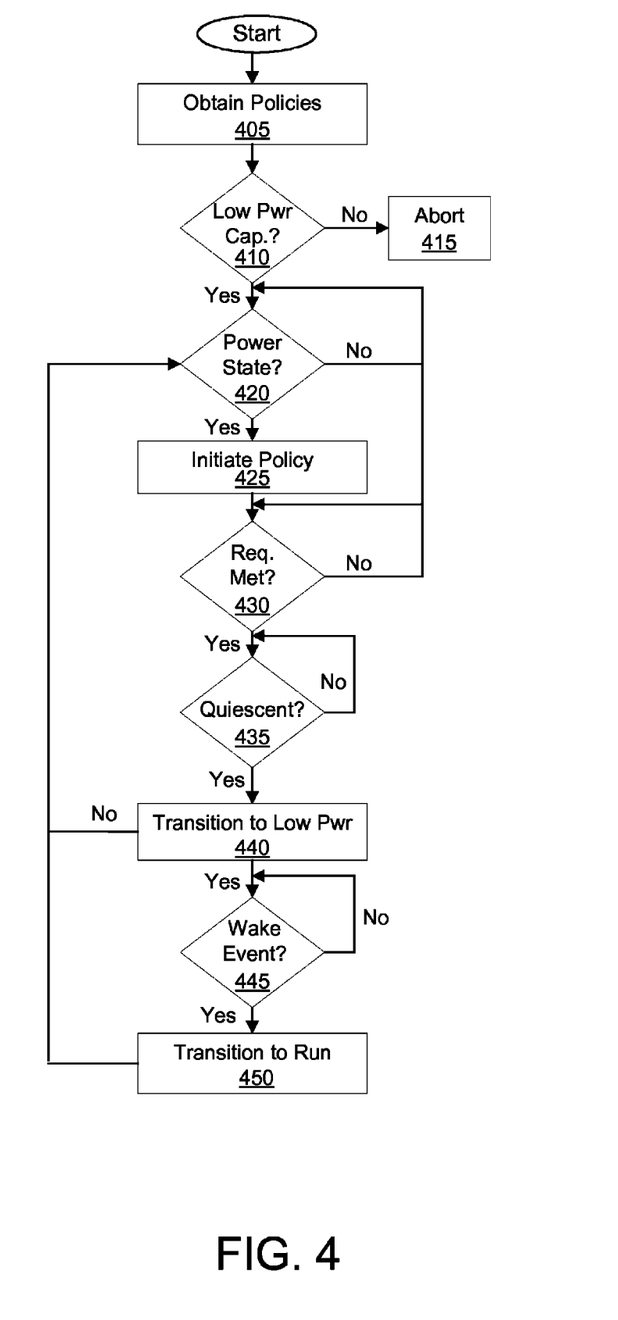
FIG. 4 is a flow chart of an example method to transition the computing platform between a run and a low power system state.

FIG. 4 is a flow chart of an example method to transition computing platform 100 between a run and a low power system state. In one example, as portrayed in FIG. 3, the run and low power system states are part of the working S0 power state. Also, as briefly mentioned above for FIG. 3, the S0 power state also includes an intermediary idle power state (S0_Idle). In this example method, processing elements 140 may transition in and out of various power states. Such as, for example, the C-state power consumption levels described in the ACPI specification. Thus, S0_Idle may represent all or a portion of processing elements 140 in a given low power state (e.g., a C-state of C1 or higher).

At block 405, in one example, power state logic 115 obtains low power policy information from low power policy interface 230. The low power policy information obtained from low power policy interface 230, for example, may be at least temporarily stored in a memory responsive to power state logic 215 (e.g., memory 210).

At block 410, in one example, power state logic 115 activates low power enable feature 215. Low power enable feature 215, for example, determines whether computing platform 100 is capable of entering the low power system state. This determination, for example, is based on the low power policy information obtained from low power policy interface 230. That information may indicate whether computing platform 100 is capable of providing power to maintain a run and a low power system state, e.g., has the appropriate power circuitry.

At block 415, for example, the low power policy information obtained from low power policy interface 230 indicates that computing platform 100 is not capable of providing power to maintain a run and a low power system state. In this example, since computing platform 100 is unable to transition to the low power system state, the process is aborted.

At block 420, in one example, power state logic 215 activates c-state feature 205. In one example, c-state feature 205 determines whether one or more processing elements of processing elements 140 have indicated entering a given C-state by querying C-state interface 220. C-state feature 205, for example, determines at what given C-state it is to initiate a power management policy for computing platform 100. This determination, for example, is based on the low power policy information obtained from low power policy interface 230. That information, for example, may indicate to c-state feature 205 that the given C-state is the C6 power state.

In one example, the given C-state or power state is the power state at which a given processing element is consuming its lowest amount of power. Thus, in the example above, the C6 power state is the lowest power state processing elements 140 may enter. In other examples, the given C-state or power state may be any other power state that is consuming less power than when the one or more processing elements of processing elements 140 are in a fully operational C0 power state. In these other examples, the given C-state is not necessarily the lowest power consuming C-state.

At block 425, in one example, c-state feature 205 has determined that the given processing element has entered the given c-state. C-state feature 205 based on that determination, for example, initiates the power management policy for computing platform 100.

At block 430, in one example, low power enable feature 215 accesses the low power policy information obtained from low power policy interface 230 and stored in the memory responsive to power state logic 215. In this example, the low power policy information includes one or more requirements that should be met before transitioning computing platform 100 to a low power state. In one example, a requirement includes a given threshold time value for low power enable feature 215 to wait before transitioning computing platform 100 to a low power system state based on the given processing element entering the given C-state. This information may also include guidance provided from an OS for computing platform 100 (e.g., via low power policy interface 230). This OS-provided guidance may include information about the expected duration for the given C-state that the given processing element has entered. The OS-provided guidance may also include transition timing values associated with meeting latency requirements to transparently transition computing platform between run and low power system states. The low power policy information may also include conditional requirements that base a transition on given conditions, e.g., number of transitions in a given period of time.

In one implementation, low power enable feature 215, based on the determination by c-state feature 205 that the given processing element has entered the given C-state, initiates a timer (not shown) or obtains a time stamp to indicate the time the given C-state was entered. In this implementation, c-state feature 215 monitors the initiated timer or tracks the age of the timestamp to determine the amount of time the given processing element has been in the given c-state. Power enable feature 215, for example, compares the age or timer value to the given threshold time value indicated in the low power policy information obtained from low power policy interface 230. Based on this comparison, for example, power enable feature 215 determines whether the given threshold value was exceeded. Thus, for example, the requirement which includes a given threshold time value for low power enable feature 215 to wait before transitioning computing platform 100 to a low power system state based on the given processing element entering the given C-state has been met.

In one example, another portion of the power management policy may include a requirement associated with the OS-provided guidance. In this example, power enable feature 215, for example, compares the expected time that the given processing element will be in the given C-state to the transition timing values associated with meeting latency requirements to transparently transition computing platform between run and low power system states. If the expected C-state time exceeds the transition timing values, in one example, the requirement associated with the OS-provided guidance has been met.

In one example, another portion of the power management policy may include guidance to not transition computing platform 100 into a low power system state if certain conditions are met. These conditions may include a given threshold number for a number of instances in a given time period that computing platform 100 has been transitioned in an out of a low power system state. This guidance, for example, may be based on the costs (e.g., latencies and/or performance) of rapidly transitioning computing platform 100 in and out of the low power system state exceeding the benefits (power saving) after the threshold number is reached for a given time period. In this example, power enable feature 215 maintains a count of the number of times computing platform 100 is transitioned in a given period. If the count does not exceed the threshold number, the requirement associated with the conditional guidance has been met.

In one example, as depicted in FIG. 4, the process may return to block 420 or to block 435. The process returns to block 420, for example, if the OS-provided guidance or the conditional guidance requirements are not met. The process returns to block 435, for example, if only the timer requirement is not met.

At block 435, in one example, low power enable feature 215 has determined that one or more requirements included in the power management policy information have been met. Low power enable feature 215, for example, then determines whether memory controller 120 and I/O controller 150 for computing platform are substantially quiescent (in a period of inactivity). As mentioned above, the output from AND gate 240 will signal quiescence via communication link 242 if both memory controller 120 and I/O controller 150 have indicated they are substantially quiescent.

At block 440, in one example, low power enable feature 215 has determined that the one or more requirements have been met and memory controller 120 and I/O controller 150 are substantially quiescent. Based on this, low power enable feature 215, in one implementation, asserts a signal over communication link 217. This signal assertion, for example, sends a signal to memory controller 120 to transition at least portions of memory 130 to a self-refresh mode and also sends a signal to low power 174 to provide low power to computing platform 100. Also, for example, the asserted input to NOR gate 250 results in an output that is de-asserted and indicates to run power 172 to not provide, disable or shut off run power to computing platform 100.

At block 445, in one example, low power enable feature 215 determines whether a wake event has occurred to cause computing platform 100 to transition out of the low power system state. A wake event, for example, may include a wake signal received via communication link 260, an indication that memory controller 120 and I/O controller 150 are no longer substantially quiescent or the given processing element is no longer in the given C-state. A wake event may also be based on a requirement included in a power management policy that places a limit on an amount of time that computing platform 100 can be in a low power system state. This limit, for example, is based on OS-provided guidance associated with transition timing values for meeting latency requirements to transparently transition computing platform 100 between run and low power system states.

At block 450, in one example, low power enable feature 215 determines that a wake event has occurred. Computing platform 100, for example, is then transitioned back to the run power system state. Low power enable feature 215, in one implementation, causes this transition by de-asserting the signal on communication link 217. As a result, for example, low power 274 is disabled and run power 272 is enabled. Also, for example, memory controller 120 transitions those portions of memory 130 placed in a self-refresh mode back to an active mode. The method, for example, then returns to block 420 to determine if or when one or more processing elements of processing elements 140 again enter a given C-state. Alternatively, although not shown in FIG. 4, the method may return to block 405.

Although the example method in FIG. 4 depicts a given sequence of actions taken to transition a computing platform from a run to a low power system state, this disclosure is not limited to this particular sequence or order of actions. This disclosure may also include a sequence of actions that includes more or less actions as depicted and described for FIG. 4.

Referring again to memory 130 in FIG. 1 and memory 210 in FIG. 2. In addition to the DRAM modules mentioned above for memory 130, memory 130 and memory 210 may include a wide variety of memory media including but not limited to volatile memory, non-volatile memory, flash, programmable variables or states, random access memory (RAM), read-only memory (ROM), flash, or other static or dynamic storage media. In one example, machine-readable instructions can be provided to memory 130 and/or memory 210 from a form of computer-readable medium. A computer-readable medium may represent any mechanism that stores information or content in a form readable by a processor. For example, a computer readable medium may include: ROM; RAM; magnetic disk storage media; optical storage media; and flash memory devices.

References made in the specification to the term "responsive to" are not limited to responsiveness to only a particular feature and/or structure. A feature may also be "responsive to" another feature and/or structure and also be located within that feature and/or structure. Additionally, the term "responsive to" may also be synonymous with other terms such as "communicatively coupled to" or "operatively coupled to," although the term is not limited in this regard.

In the previous descriptions, for the purpose of explanation, numerous specific details were set forth in order to provide an understanding of this disclosure. It will be apparent that the disclosure can be practiced without these specific details. In other instances, structures and devices were shown in block diagram form in order to avoid obscuring the disclosure.

What is claimed is:

1. A method comprising:
    initiating a power management policy based on a processing element for a computing platform entering a given power state, the power management policy to include:
        determining whether an input/output (I/O) controller and a memory controller for the computing platform are substantially quiescent; and
        transitioning the computing platform to a low power system state from a run power system state based on a determination that both the I/O controller and the memory controller are substantially quiescent and an indication the computing platform is capable of entering the low power system state, the low power system state to include entering one or more devices responsive to the computing platform in a power level adequate to retain a configuration state to enable the one or more devices to transition back to the run power system state in a manner substantially transparent to an operating system for the computing platform;
    wherein transitioning the computing platform to the low power state includes transitioning based on meeting a requirement, the requirement to include a number of instances in a given time period that the computing platform has been transitioned in and out of the low power system state is less than a given threshold number.

2. A method according to claim 1, the power management policy further comprising:
    transitioning the computing platform back to the run power system state based on a wake event to include one of: a wake signal, an indication that the memory controller and I/O controller are no longer substantially quiescent, the processing element is no longer in the given power state and exceeding a time limit for the computing platform to remain in the low power system state.

3. A method according to claim 1, wherein transitioning the computing platform to the low power system state further comprises transitioning based on meeting an additional requirement, the requirement to include a timer value exceeding a given threshold value, the time value determined based on a timer initiated following the processing element entering the given power state.

4. A method according to claim 1, wherein transitioning the computing platform to the low power system state further comprises transitioning based on meeting an additional requirement, the additional requirement associated with guidance provided by the operating system for the computing platform, the guidance to include an expected duration for the processing element entering the given power state and a threshold time value associated with a maximum allowed latency for transparently transitioning the computing platform between run and low power system states based on the processing element in the given power state.

5. A method according to claim 1, wherein the processing element for the computing platform entering the given power state comprises the given power state as the processing element's lowest power consuming power state.

6. A method according to claim 1, wherein the one or more devices responsive to the computing platform includes memory for the computing platform, the memory to include one or more dynamic random access memory (DRAM) modules, the low power system state for the one or more DRAM modules to include the one or more DRAM modules in a self refresh mode.

7. A method according to claim 1, wherein the computing platform operates in compliance with an industry specification identified as the Advanced Configuration Power Interface (ACPI) Specification, the run power system state to comprise an S0 power state and the processing element's given power state to comprise any power state other than a C0 power state.

8. An apparatus comprising:
  a controller for a computing platform to include configuration logic to configure one or more devices responsive to the computing platform for operation on the computing platform, the controller to also include power state logic to:
    initiate a power management policy based on a processing element for the computing platform entering a given power state, the power management policy to include the power state logic to:
      determine whether an input/output (I/O) controller and a memory controller for the computing platform are substantially quiescent; and
      cause the computing platform to transition to a low power system state from a run power system state based on a determination that both the I/O controller and the memory controller are substantially quiescent and an indication that the computing platform is capable of entering the low power system state, the low power system state to include entering the one or more devices responsive to the computing platform in a power level adequate to retain a configuration state to enable the one or more devices to transition back to the run power system state in a manner substantially transparent to an operating system for the computing platform;
  wherein the power state logic to cause the computing platform to transition to the low power state includes transitioning based on meeting a requirement, the requirement to include a number of instances in a given time period that the computing platform has been transitioned in and out of the low power system state is less than a given threshold number.

9. An apparatus according to claim 8, further comprising the power state logic to:
  transition the computing platform back to the run power system state based on a wake event to include one of: a wake signal, an indication that the memory controller and I/O controller are no longer substantially quiescent, the processing element is no longer in the given power state and exceeding a time limit for the computing platform to remain in the low power system state.

10. An apparatus according to claim 8, wherein the processing element for the computing platform entering the given power state comprises the given power state as the processing element's lowest power consuming power state.

11. An apparatus according to claim 8, wherein the computing platform operates in compliance with an industry specification identified as the Advanced Configuration Power Interface (ACPI) Specification, the run power system state to comprise an S0 power state and the processing element's given power state to comprise any power state other than a C0 power state.

12. An apparatus according to claim 8, wherein the controller is resident on a system on a chip that is resident on the computing platform, the system on a chip to also include the processing element, the memory controller and the I/O controller.

13. An apparatus according to claim 8, wherein the controller is part of a chipset that also includes the memory controller and the I/O controller.

14. A system comprising:
  one or more processing elements for a computing platform;
  power circuitry to provide power to the computing platform, the power circuitry capable of providing power to maintain at least a run power system state and a low power system state; and
  a controller for the computing platform to include configuration logic to configure one or more devices responsive to the computing platform for operation on the computing platform, the controller to also include power state logic to:
    initiate a power management policy based on at least one processing element of the one or more processing elements entering a given power state, the power management policy to include the power logic to:
      determine whether an input/output (I/O) controller and a memory controller for the computing platform are substantially quiescent; and
      cause the computing platform to transition to a low power system state from a run power system state based on a determination that both the I/O controller and the memory controller are substantially quiescent and an indication that the computing platform is capable of entering the low power system state, the low power system state to include placing the one or more devices responsive to the computing platform in a power level adequate to retain a configuration state to enable the one or more devices to transition back to the run power system state in a manner substantially transparent to an operating system for the computing platform;
  wherein the power logic to cause the computing platform to transition to the low power state includes transitioning based on meeting a requirement, the requirement to include a number of instances in a given time period that the computing platform has been transitioned in and out of the low power system state is less than a given threshold number.

15. A system according to claim 14, further comprising the power state logic to:

transition the computing platform back to the run power system state based on a wake event to include one of: a wake signal, an indication that the memory controller and I/O controller are no longer substantially quiescent, the at least one processing element is no longer in the given power state and exceeding a time limit for the computing platform to remain in the low power system state.

16. A system according to claim 14, wherein the at least one processing element for the computing platform entering the given power state comprises the given power state as the at least one processing element's lowest power consuming power state.

17. A system according to claim 14, wherein the one or more devices responsive to the computing platform comprises memory resident on the computing device, the memory to include one or more dynamic random access memory (DRAM) modules, the low power system state for the one or more DRAM modules to include the one or more DRAM modules in a self refresh mode.

18. A system according to claim 14, wherein the computing platform operates in compliance with an industry specification identified as the Advanced Configuration Power Interface (ACPI) Specification, the run power system state to comprise an S0 power state and the at least one processing element's given power state to comprise any power state other than a C0 power state.

19. A system according to claim 14, wherein the controller to include the configuration logic and the power state logic is integrated with the I/O controller.

20. A non-transitory computer-readable storage medium having stored thereon data representing sequences of instructions that, when executed by a processor, cause the processor to perform operations comprising:

initiating a power management policy based on a processing element for a computing platform entering a given power state, the power management policy to include:

determining whether an input/output (I/O) controller and a memory controller for the computing platform are substantially quiescent; and transitioning the computing platform to a low power system state from a run power system state based on a determination that both the I/O controller and the memory controller are substantially quiescent and an indication the computing platform is capable of entering the low power system state, the low power system state to include entering one or more devices responsive to the computing platform in a power level adequate to retain a configuration state to enable the one or more devices to transition back to the run power system state in a manner substantially transparent to an operating system for the computing platform;

wherein transitioning the computing platform to the low power state includes transitioning based on meeting a requirement, the requirement to include a number of instances in a given time period that the computing platform has been transitioned in and out of the low power system state is less than a given threshold number.

21. A medium according to claim 20, the power management policy further comprising:

transitioning the computing platform back to the run power system state based on a wake event to include one of: a wake signal, an indication that the memory controller and I/O controller are no longer substantially quiescent, the processing element is no longer in the given power state and exceeding a time limit for the computing platform to remain in the low power system state.

22. A medium according to claim 20, wherein transitioning the computing platform to the low power system state further comprises transitioning based on meeting an additional requirement, the additional requirement to include a timer value exceeding a given threshold value, the time value determined based on a timer initiated following the processing element entering the given power state.

23. A medium according to claim 20, wherein transitioning the computing platform to the low power system state further comprises transitioning based on meeting an additional requirement, the additional requirement associated with guidance provided by the operating system for the computing platform, the guidance to include an expected duration for the processing element entering the given power state and a threshold time value associated with a maximum allowed latency for transparently transitioning the computing platform between run and low power system states based on the processing element in the given power state.

24. A medium according to claim 20, wherein the processing element for the computing platform entering the given power state comprises the given power state as the processing element's lowest power consuming power state.

25. A medium according to claim 20, wherein the one or more devices responsive to the computing platform includes memory for the computing platform, the memory to include one or more dynamic random access memory (DRAM) modules, the low power system state for the one or more DRAM modules to include the one or more DRAM modules in a self refresh mode.

26. A medium according to claim 20, wherein the computing platform operates in compliance with an industry specification identified as the Advanced Configuration Power Interface (ACPI) Specification, the run power system state to comprise an S0 power state and the processing element's given power state to comprise any power state other than a C0 power state.

* * * * *